United States Patent
Wei et al.

(10) Patent No.: US 11,635,059 B2
(45) Date of Patent: Apr. 25, 2023

(54) WIND TURBINE POWER PLANT WITH POWER SAVING CONTROL METHOD

(71) Applicant: VESTAS WIND SYSTEMS A/S, Aarhus N (DK)

(72) Inventors: Mu Wei, Solbjerg (DK); Vinu Vijayan, Trivandrum (IN); Eric German, Goderich (CA); Brian Dial-Lapcewich, Oxford, MS (US)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 17/403,224

(22) Filed: Aug. 16, 2021

(65) Prior Publication Data

US 2023/0052726 A1 Feb. 16, 2023

(51) Int. Cl.
  *F03D 9/00* (2016.01)
  *H02P 9/04* (2006.01)
  (Continued)

(52) U.S. Cl.
  CPC ........... *F03D 7/0284* (2013.01); *F03D 7/048* (2013.01); *F03D 9/257* (2017.02);
  (Continued)

(58) Field of Classification Search
  CPC ........ F03D 7/0284; F03D 7/048; F03D 9/257; F05B 2220/706; F05B 2270/1033; F05B 2270/335; F05B 2270/337
  See application file for complete search history.

(56) References Cited

U.S. PATENT DOCUMENTS 8,841,796 B2 * 9/2014 Rosenvard ............... H02J 11/00
  307/41
9,702,343 B2 * 7/2017 Krüger .................... F03D 9/257
(Continued)

FOREIGN PATENT DOCUMENTS

EP  2645530 B1  8/2018
EP  3245400 B1  1/2019

OTHER PUBLICATIONS

International Search Report and Written Opinion for PCT Application No. PCT/DK2022/050161, dated Nov. 3, 2022.
(Continued)

*Primary Examiner* — Tulsidas C Patel
*Assistant Examiner* — Thomas K Quigley
(74) *Attorney, Agent, or Firm* — Patterson + Sheridan, LLP

(57) ABSTRACT

Methods and apparatus for reducing peak power consumption of a grid connected power plant having a plurality of wind turbines. In response to determining that a power production value of the power plant is below a power threshold, one method includes: after a first time delay of a first group of one or more wind turbines, control the first group to operate in a power saving mode for a predefined first power saving period; and after a first time delay of a second group of one or more other wind turbines, control the second group to operate in the power saving mode for a predefined second power saving period. The first time delay of the first group is less than the first time delay of the second group and the power saving mode inhibits a power consuming activity for the wind turbines operating in the power saving mode.

19 Claims, 2 Drawing Sheets

(51) Int. Cl.
*F03D 7/02* (2006.01)
*F03D 7/04* (2006.01)
*F03D 9/25* (2016.01)

(52) U.S. Cl.
CPC . *F05B 2220/706* (2013.01); *F05B 2270/1033* (2013.01); *F05B 2270/335* (2013.01); *F05B 2270/337* (2013.01)

(56) References Cited

U.S. PATENT DOCUMENTS

| | | | |
|---|---|---|---|
| 10,018,180 B2* | 7/2018 | Kjær | F03D 7/048 |
| 10,135,251 B2* | 11/2018 | Berard | H02J 3/32 |
| 2011/0175355 A1 | 7/2011 | Rosenvard | |
| 2012/0083939 A1* | 4/2012 | Rognli | H02J 13/00004 |
| | | | 700/297 |
| 2013/0175801 A1 | 7/2013 | Matzen | |
| 2015/0330363 A1* | 11/2015 | Krüger | F03D 7/0284 |
| | | | 290/44 |
| 2016/0226258 A1 | 8/2016 | Giertz | |
| 2016/0329713 A1* | 11/2016 | Berard | H02M 5/04 |
| 2016/0365729 A1* | 12/2016 | Pochana | G05B 13/021 |
| 2018/0198283 A1* | 7/2018 | Pochana | G05B 13/021 |

OTHER PUBLICATIONS

Hawkins et al., "Method of Operating a Wind Turbine", Prior Art Publishing GMBH, Prior Art Published GMBH, Manfred-Von-Richthofen-Str. 9, 12101 Berline Germany, vol. www.priorartregister.com, Jul. 31, 2019 (Jul. 31, 2019), pp. 1-6, XP007022794.

* cited by examiner

WIND TURBINE POWER PLANT WITH POWER SAVING CONTROL METHOD

FIELD OF THE INVENTION

The invention relates to control of a power plant comprising a plurality of power generating units, particularly power plants which has one or more wind turbines and, particularly to handling wind turbine's consumption of power from the grid under conditions with low wind when wind turbines are paused.

BACKGROUND OF THE INVENTION

Yawing activities of wind turbines are used to turn the nacelles so that they face the wind for the purpose of maximizing energy production, reducing wind turbines loads, e.g. in low wind situations or when wind turbines are paused, or for cable unwinding operations.

During low wind conditions where the wind turbines are not producing power, or in other situations where the wind turbines are paused, it may be disadvantageous to perform such yawing activities since they require supply of power from the grid.

Accordingly, there is a need for improving control of power plants comprising wind turbines in order to handle such yawing activities and other power consuming activities of the wind turbines in situations where the wind turbines are not producing power.

SUMMARY

It is an object of the invention to improve control of power plants comprising wind turbines to alleviate one the above mentioned problems, and therefore to provide a method which provides improved handling of power consuming activities of wind turbines in a situation where the power plant does not produce power or insufficient power to the grid.

In a first aspect of the invention, a method for reducing peak power consumption of a power plant which comprises a plurality of power generating units including a plurality of wind turbines is presented, wherein the power plant is connected to an electrical power grid, the method comprises
  in response to determining that a power production value of the power plant is below a power threshold, perform the following steps,
  after a first time delay of a first group of one or more wind turbines, control the first group to initiate and operate in a power saving mode for a predefined first power saving period of the first group, and
  after a first time delay of a second group of one or more other wind turbines, control the second group to initiate and operate in the power saving mode for a predefined first power saving period of the second-group,
  wherein the first time delay of the first group is less than the first time delay of the second-group, and
  wherein the power saving mode inhibits a power consuming activity for the wind turbines operating in the power saving mode.

Advantageously, by setting power saving modes for the groups of wind turbines with different time delays, power consuming activities such as yawing activities, possibly noncritical yawing activities, can be deferred with different delays according to the first and second time delays. The first and second time delay can be predefined time delays, i.e. with predetermined lengths. The method applies to two or more groups of wind turbines.

According to an embodiment the method comprises, after the first power saving period of the first group has elapsed, control the first group to disable the power saving mode, and after the first power saving period of the second group has elapsed, control the second group to disable the power saving mode, such that the wind turbines are enabled to consume power.

Advantageously, by disabling the power saving modes, the groups of wind turbines are enabled to consume power.

During the disabled power saving periods, the wind turbines are allowed to consume power. Since the power saving periods are predetermined, e.g. to have equal lengths, the disabled power saving periods can be arranged so that the first and second groups of wind turbines are not able to activate power consuming activities simultaneously, or at least so that power consuming activities can only run simultaneously for the first and second groups for a limited and predetermined period of time.

According to an embodiment, the disabling of the power saving mode for the first group is limited to a second time delay of the first group, and the disabling of the power saving mode for the second group of the one or more wind turbines is limited to a second time delay of the second group.

Advantageously, by the limited time delays, time shifted time delays can be set for different groups of wind turbines, thereby allowing wind turbines to consume power in different periods, possibly non-overlapping periods, or partially overlapping, but not fully overlapping periods. By determining when different groups are allowed to consume power, the peak power consumption of a power plant can be controlled.

According to an embodiment, the first time delay of the second group is less than or equal to a sum of the first time delay of the first group and first power saving period of the first group. Accordingly, the second power saving period, or other subsequent period, can only be delayed to an extent where the second power saving period starts immediately after the end of the first power saving period.

According to an embodiment, as long as the power production value of the power plant is below the power threshold, at any time after the first time delay of the first group has elapsed, at least one of the first and second groups is controlled to operate in the power saving mode. Thus, at any time after the first time delay of the first group, the peak power consumption will be reduced as compared to a situation where all groups are allowed to consume power.

According to an embodiment, the method comprises sequentially checking if the power production value of the power plant is below the power threshold, and if this is not the case, cancel any power saving mode. Thus, as soon as the power plant produces sufficient power, the power plant can operate normally without constraints on power consuming activities.

According to an embodiment, the power production value is based on an actual power production of the power plant. This power production value is determined based on the combination of the power, i.e. the active power, supplied to the grid and the power consumption of the wind turbines or the power plant. Thus, the power production value is negative when the power supplied to the grid is zero.

According to another embodiment, the power production value is based on estimated future power productions of the wind turbines.

The power consuming activity may include one or more of a yawing activity, a cable untwist activity, a hydraulic activity, a cooling activity and a heating activity.

According to an embodiment, the power saving modes for each of the respective first and second groups are alternately set and disabled until the power production value of the power plant is above the power threshold.

According to an embodiment, the first and second groups of the one or more wind turbines are determined dependent on the power production value of each of the wind turbines so that the one or more wind turbines of the first group has the lowest sum of power production values and the one or more wind turbines of the second group has the second lowest sum of power production values. Therefore, the group which has the largest consumption of power is set to a power saving mode first so as to generate the largest reduction of peak power consumption to a start.

According to an embodiment, the method comprises the further steps of:
- after a first time delay of a third group of one or more wind turbines, control the third group to initiate and operate in the power saving mode for a first power saving period of the third group,
- wherein the first time delay of the second group is less than the first time delay of the third group.

A second aspect of the invention relates to a central controller for controlling power consumption of a power plant which comprises a plurality of power generating units including a plurality of wind turbines, wherein the power plant is connected to an electrical power grid, and where the central controller is arranged to perform the method according to the first aspect.

A third aspect of the invention relates to a power plant which comprises a plurality of power generating units including at least one wind turbine and the central controller according to the second aspect.

A fourth aspect of the invention relates to computer program product comprising software code adapted to control a power plant when executed on a data processing system, the computer program product being adapted to perform the method of the first aspect.

In general, the various aspects and embodiments of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DETAILED DESCRIPTION

Figure 1:
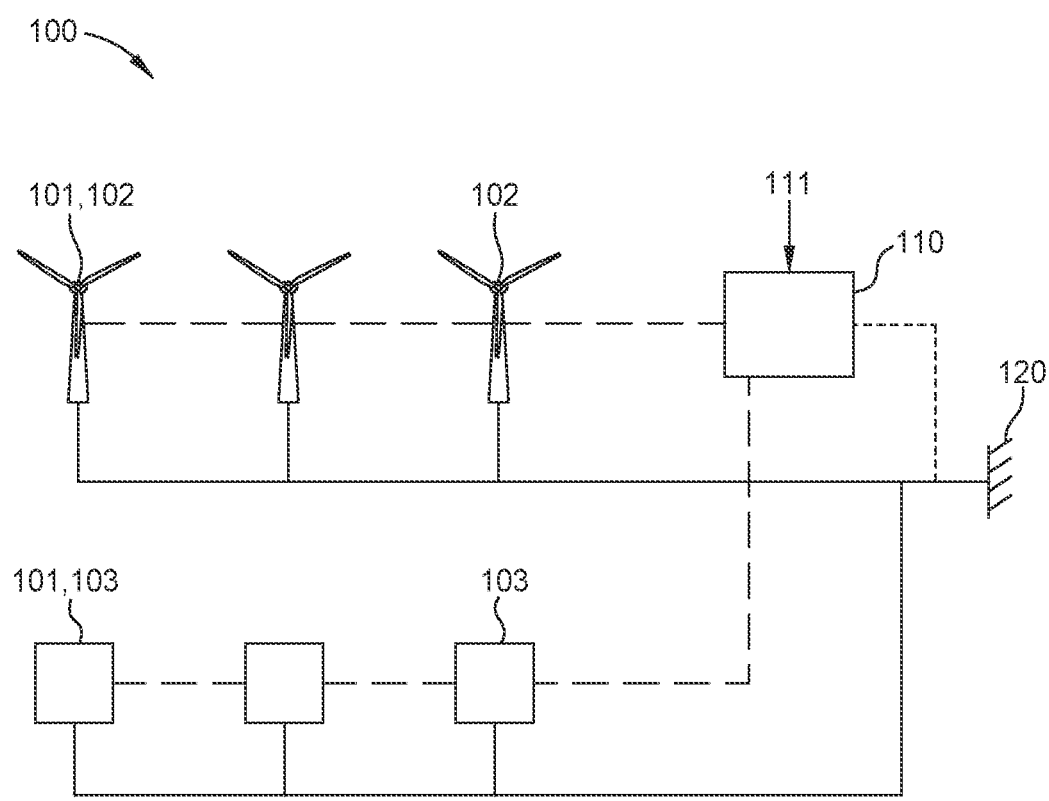
FIG. 1 shows a power plant including a plurality of power generating units and wind turbines.

FIG. 1 shows a power plant 100 which comprises a plurality of power generating units 101 such as wind turbines 102. The power plant 100 may be a renewable power plant comprising only renewable power generating units. In general, the power generating units 101 may consist of different types of power generating units, e.g. different types of renewable power generating units such as solar power units 103 (e.g. photovoltaic solar panels) and wind turbines.

According to an embodiment, the power producing units 101 comprises a plurality of wind turbines 102. The power plant 100 may comprise at least two such as three power generating units 101 of the same or different types, i.e. a mix, of different types of power generating units. For example, the power plant 100 may consist only of wind turbines 102 and in this case at least two or three wind turbines 102. In another example, the power plant 100 comprises at least two wind turbines 102 and at least one or two other power generating units 101.

The power plant is connectable with an electrical power grid 120 for supplying power from the power generating units 101 to the electrical power grid, and in case of no production, supply power to the turbines.

At least one of the wind turbines 102 of the power plant is controlled by a central controller 110. The central controller 110 is arranged to control power generation from the wind turbines 102 according to a power plant reference which defines the desired power to be supplied to the grid from the power plant 100. The power plant reference may be provided via input 111.

Furthermore, the central controller is arranged to set operational modes of the wind turbines 102 such as controlling the wind turbines to operate in the power saving mode which inhibits a power consuming activity for the wind turbines and thereby reduce the power consumption from the grid. The power saving mode may be relevant in situations where the wind turbines do not produce power or only produce a small amount of power, e.g. in situations with low wind or when wind turbines are paused. The paused state of a wind turbine can be any state where the wind turbine is not producing power. Similarly, the central controller is arranged to control the wind turbines to operate in a normal mode, or power consumption enabled mode, where the wind turbines are allowed to consume power from the grid, preferably without restrictions.

When a wind turbine is operated in a power saving mode, one or more power consuming activities are inhibited. Examples of inhibited power consuming activities includes yawing, cable untwisting, a hydraulic activities, lubrication, cooling and heating activities. Thus, when operating in the power saving mode at least some power consuming activates are inhibited or can be prevented from starting, while other power consuming activities cannot be inhibited since they are essential for the continued operation of the wind turbine. Examples of such essential activities which should not be shut down includes communication, load and wind monitoring and other.

The wind turbine 101 may comprise a tower and a rotor with at least one rotor blade, such as three blades. The rotor is connected to a nacelle which is mounted on top of the tower and being adapted to drive a generator situated inside the nacelle. The rotor is rotatable by action of the wind. The wind induced rotational energy of the rotor blades is transferred via a shaft to the generator. Thus, the wind turbine is capable of converting kinetic energy of the wind into mechanical energy by means of the rotor blades and, subsequently, into electric power by means of the generator. The generator may include a power converter for converting the generator AC power into a DC power and a power inverter for converting the DC power into an AC power to be injected into the electrical power grid. The generator of the wind turbine 102 is controllable to produce power corresponding to power set-points provided by the central controller 110. For wind turbines, the output power may be adjusted according to the power set-point by adjusting the pitch of the rotor blades or by controlling the power converter to adjust the power production.

In a situation where a plurality of wind turbines do not produce power, e.g. because they are paused, certain power consumers of the wind turbines such as yawing systems, hydraulic systems, cooling systems and heating systems may be active and thereby consume power from the grid. For example, the yawing system may be activated for the purpose of performing cable untwisting.

Even during a low wind situation where the wind turbines are paused, the wind turbines may perform yawing to face the wind, e.g. for the purpose of minimizing tower and blade loads due to oscillations, or for the purpose of being ready to produce power when the wind speed increases.

When the turbine is yawing to face the wind, it is likely that it yaws continuously to one direction which can cause cables inside the tower to get twisted. The cables of the wind turbine has a limit on the twisting capacity. Therefore, the wind turbine may be required to perform an untwisting process by controlling the yaw system to perform a nacelle rotation. The untwisting process is preferably performed at low wind speeds, e.g. to avoid loss of power production or to avoid high loads that could if performed during high wind speeds.

Yawing performed to face the wind and to perform untwisting consumes power, i.e. yawing motors of the yawing system consumes power.

Accordingly, in order to limit peak power consumption in situations where the wind turbines draws power from the grid e.g. due to low production, it may be advantageous to defer the power consuming activity such as the yawing activity, the untwisting activity, a hydraulic activity, a cooling activity, a heating activity or other.

Figure 2:
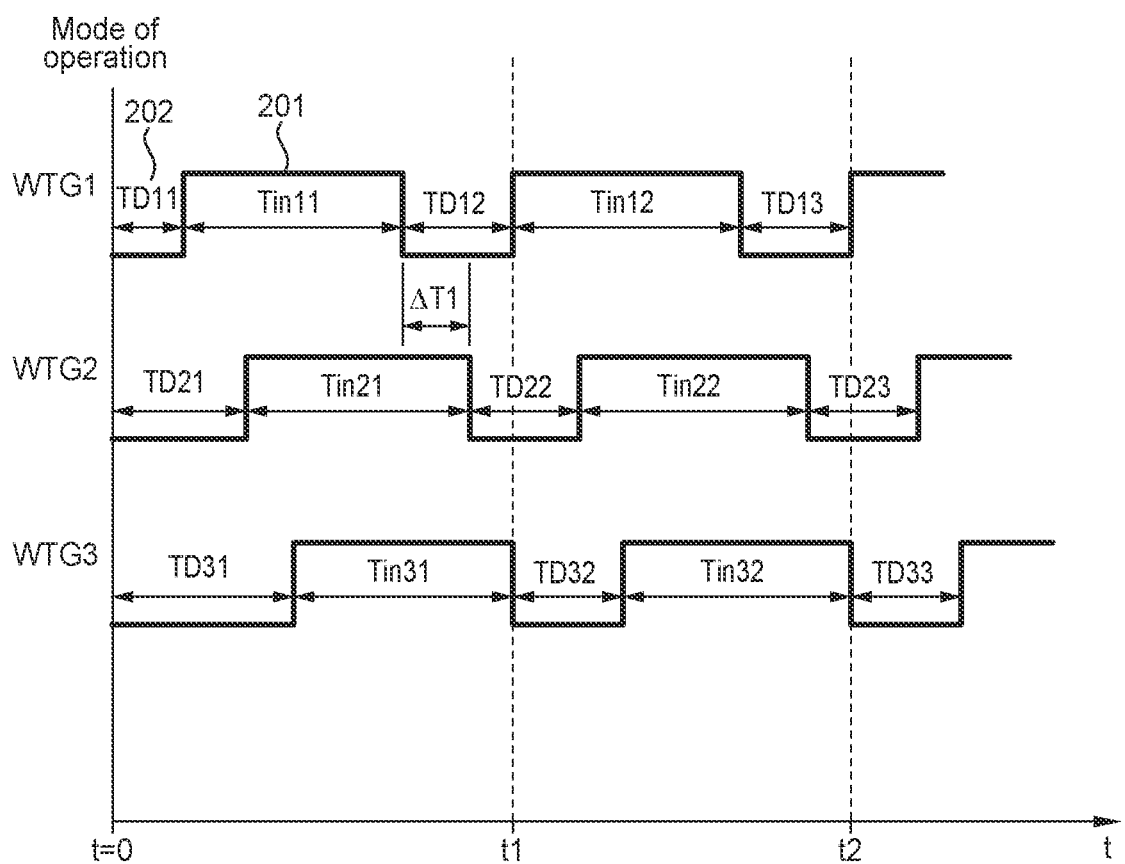
FIG. 2 shows a timing diagram illustrating a method for reducing peak power consumption of the power plant.

FIG. 2 shows a timing diagram illustrating a method for reducing peak power consumption of the power plant 100 connected to an electrical power grid.

The control method for reducing peak power consumption of the power plant 100 may be invoked when the central controller 110 determines that a power production value Pprod of the power plant 100 is below a power threshold Pt. The power production value includes the power consumption of the wind turbines and may therefore become negative. Accordingly, the power threshold Pt may be represented by a negative value, a positive value or zero. Preferably, the threshold is set such that power is drawn from the grid when the turbines are operated in a non-power inhibited manner.

The power production value may be the measured actual power production of the power plant or a value based on the actual power production. The individual power production values of individual wind turbines which also include individual power consumption values can be summed to determine the power production value of the power plant, or at least the wind turbines thereof. Alternatively, the power production value may be determined based on estimated power productions of the wind turbines, such as estimated future power productions of the wind turbines. For example, if the future power production Pprod is estimated to decrease below the power threshold Pt within the next 1-2 minutes, the control method for reducing peak power may be planned to be invoked at a certain time before the estimated period where the power production is estimated to pass the power threshold.

The timing diagram shows the operational modes 201, 202 of the wind turbines or groups of wind turbines WTG1, WTG2, WTG3 as a function of time t. Thus, each group of wind turbines may include one or more wind turbines 102.

At t=0, the peak power consumption reduction method may be invoked, based on the actual or estimated power production value and the power threshold.

For the a first group WTG1 of one or more wind turbines, an optional first time delay TD11, such as a predetermined time delay, may be started at t=0. Thus, the operational mode 202 of the first group WTG1 during TD11 may be the same operational mode present before t=0, i.e. a normal operational mode where power consumers of the wind turbines are allowed to consume power.

When the first time delay of the first group TD11 has lapsed, the operational mode of the one or more wind turbines of the first group are changed to a power saving mode 201 planned to take place during a predefined and predetermined first power saving period of the first group Tin11.

For the second group WTG2 of the one or more wind turbines, a required first time delay TD21, such as a predetermined time delay, is also started at t=0. Thus, the operational mode 202 of the second group WTG2 during TD21 may be the same operational mode present before t=0, e.g. the same normal operational mode which is set for the first group WTG1 during the first time delay TD11.

When the first time delay of the second group TD21 has lapsed, the operational mode of the one or more wind turbines of the second group is changed to the power saving mode 201 which takes place during the predetermined first power saving period of the second group Tin21.

Similarly, for a possible third group WTG3 of the one or more wind turbines, as well as further groups, a required first time delay TD31 is also started at t=0, wherein the third group WTG3 is operated in the normal mode or similar mode wherein power consumers are allowed to consume power.

When the first time delay of the third group T321 has lapsed, the operational mode is changed to the power saving mode 201 which takes place during the predetermined first power saving period of the third group Tin31.

The first power saving periods Tin11, Tin21, Tin31 of the groups of wind turbines WTG1, WTG2, WTG3, as well as subsequent power saving periods, may have equal lengths for among the different groups, although it is not a requirement.

After the lapse of each of the first power saving periods Tin11, Tin21, Tin31, the operational mode of the groups of wind turbines WTG1, WTG2, WTG3, is set to the normal operational mode or other mode where the power consumers are allowed to consume power during second time delay periods TD12, TD22, TD32.

The first time delays for the first, second and third groups TD11, TD21, TD31 have different durations so that TD11 is less than TD21, and TD21 is less than TD31, i.e. TD11<TD21<TD31.

In an example, the first time delay for a subsequent group, such as the first time delay for the second group TD21, must end at the latest when the first power saving period for the previous group ends, such as when the first power saving period Tin11 ends, i.e. TD21 should be less than or equal to TD11+Tin11, i.e. TD21≤TD11+Tin11, or in general TDi+1, 1≤TDi, 1+Tini,1, where i is the number of the previous group of wind turbines and the second index 1 denotes the first time delay.

The second time delay periods TD12, TD22, TD32 are shifted relative to each other, at least due to the different durations of the first time delays TD11, TD21, TD31, as shown in FIG. 2.

The second time delay periods TD12, TD22, TD32 may have the same duration, and the subsequent third and later time delay periods for the groups may have the same duration as the previous groups.

After the first power saving period Tin11 for the first group WTG1, the wind turbines in the first group are allowed to consume power during TD12.

The corresponding power consumption enabled period, or time delay period TD22, for the second group is deferred by $\Delta T1$ relative to TD12, where $\Delta T1=TD21+Tin21-(TD11+Tin11)$, or in general $\Delta Ti=TDi+1,1+Tini+1,1-(TDi,1+Tini,1)$, where i is the number of the previous group of wind turbines and the second index 1 denotes the first time delay.

In an example, $\Delta Ti$ is equal to $TDi,2$ for all groups WTGi of wind turbines when $TDi+1,1-TDi,1=TDi,2$ and $Tini+1,1=Tini,1$. Of course, this applies equally for subsequent periods.

In this case, all time delay periods are non-overlapping, at least for the second time delay period TDi,2, so that only wind turbines of one group at a time are allowed to consume power. This reduces peak consumption of the power plant since only the one or more wind turbines of a given group can consume power simultaneously.

In another example, $\Delta Ti$ is less than $TDi,2$, i.e. $\Delta Ti<TDi,2$, for all groups WTGi of wind turbines, possibly also for subsequent periods. In that case, time delay periods for consecutive groups are overlapping but deferred. However, by setting $\Delta Ti$ sufficiently large, at least some time delay periods may be non-overlapping. For example, if $\Delta T1=0.5*TD12$, the second time delay period for the third group TD32 will be non-overlapping with the second time delay period for the first group TD12 and, thereby, only the power consumption of the first and second groups WTG1, WTG2, may take place simultaneously for the overlapping portion.

The power consuming activities may start-up autonomously, e.g. in response to sensor measurements, e.g. in response to temperature readings, in response to events, e.g. a change of wind direction or a cable winding event both requiring a yawing action. Alternatively, the power consuming activities may be planned to take place at certain time intervals. However, the power saving mode 201 inhibits the power consuming activity of one or more power consuming activities, e.g. by simply refusing any request for starting a power consuming activity, by setting any request for starting a power consuming activity on hold, or by postponing any request for starting a power consuming activity, e.g. by a certain postponement time or until the power saving mode 201 ends.

The operational mode of the wind turbines during the time delay periods TD11, TD12, . . . , TD21, TD22, . . . may be the same normal operational mode for all wind turbines or the wind turbines may operate in different operational modes, but modes where the power consumers of the wind turbines are allowed to consume power.

In general, as long as the power production value of the power plant is below the power threshold, the timing diagram ensures that, at any time after the first time delay of the first group TD11 has elapsed, that at least one of the first and second groups, possibly further groups, is controlled to operate in the power saving mode 201. To achieve the greatest effect in reducing the peak power consumption, the timing diagram may be determined so that, at any time after the first time delay of the first group TD11 has elapsed, only one of the groups of wind turbines is controlled to operate in the normal mode 202.

The relative locations of time delay periods TD12-TD32 and subsequent time delay periods are determined solely by the different durations of the first time period delays TD11-TD31, at least when the predefined power saving periods Tin11-Tin31 and subsequent power saving periods all have the same length and the time delay periods also have the same length.

Thus, in an example, at least the predefined first power saving periods Tin11-Tin31, optionally also subsequent power saving periods, for any group of wind turbines have the same length. Similarly, at least the second time delay periods TD12-TD32, optionally also the subsequent time delay periods, for any group of wind turbines have the same length.

In an example, a first sum of the first time delay of the first group TD11, the first power saving period of the first group Tin11 and the second time delay of the first group TD12 is less than or equal to a second sum of first time delay of the second group TD21 and the first power saving period of the second group Tin21, so that only one group of wind turbines can run a power consuming activity at a time.

The method includes verifying, e.g. at predetermined times or in response to a change of one or the operational modes 201, 202 such as the initiation of a power saving mode 201, if the power production value of the power plant is still below the power threshold. In case the power production value of the power plant is no longer below the power threshold, the control of the wind turbines according to the timing diagram is cancelled and any power saving mode is cancelled.

As long as the power production value of the power plant is still below the power threshold, or as long as the control of the wind turbines according to the timing diagram is allowed, the power saving modes 201 for each of the groups WTG1-WTG3, are alternately set and disabled, with a time delay period TD21, TD22, TD32, TD13, . . . , TD33, between consecutive power saving modes 201.

The control of the wind turbines according to the timing diagram may be stopped for other reasons than the power production value of the power plant increased above the power threshold. For example, the alternating setting of the power saving modes 201 may be stopped if turbulent wind conditions are detected or predicted or if certain maintenance operations of the wind turbines are required.

The forming of groups of one or more wind turbines may be determined based on random selections, based on wear status, remaining lifetime, based on power production values, or other criteria. For example, by determining the sum of power production values of individual wind turbines for each group, the groups can be arranged in order of increasing values of the sum, considering that the values may be negative since they include power consumption or estimated power consumption. In an example, the groups of one or more turbines only comprise one turbine each.

The above described method steps may be coordinated and performed by the central control system 110 being part of the power plant 100 or the method steps or some of them may be performed by other systems such as decentral control systems. The control systems may be implemented as algorithms and executed by one or more computers.

The invention claimed is:
1. A method for reducing peak power consumption of a power plant which comprises a plurality of power generating units including a plurality of wind turbines, wherein the power plant is connected to an electrical power grid, the method comprises:

in response to determining that a power production value of the power plant is below a power threshold:

after a first time delay of a first group of one or more wind turbines, controlling the first group to operate in a power saving mode for a predefined first power saving period of the first group; and after a first time delay of a second group of one or more other wind turbines, controlling the second group to operate in the power saving mode for a predefined first power saving period of the second group;

wherein the first time delay of the first group is less than the first time delay of the second group; and wherein the power saving mode inhibits a power consuming activity for the wind turbines operating in the power saving mode.

2. The method of claim 1, comprising:

after the first power saving period of the first group has elapsed, controlling the first group to stop operating in the power saving mode; and after the first power saving period of the second group has elapsed, controlling the second group to stop operating in the power saving mode, such that the wind turbines are enabled to consume power.

3. The method of claim 2, wherein controlling the first group to stop operating in the power saving mode is limited to a second time delay of the first group, and wherein controlling the second group to stop operating in the power saving mode is limited to a second time delay of the second group.

4. The method of claim 1, wherein the first time delay of the second group is less than or equal to a sum of the first time delay of the first group and first power saving period of the first group.

5. The method of claim 1, further comprising:

checking if the power production value of the power plant is below the power threshold, and if the power production value of the power plant is at or above the power threshold, cancelling any power saving mode.

6. The method of claim 1, wherein the power production value is based on an actual power production of the power plant.

7. The method of claim 1, wherein the power production value is based on estimated future power productions of the wind turbines.

8. The method of claim 1, wherein the power consuming activity comprises one or more of a yawing activity, a cable untwist activity, a hydraulic activity, a cooling activity and a heating activity.

9. The method of claim 1, wherein the first group is not operating in the power saving mode when the second group operates in the power saving mode.

10. The method of claim 1, wherein the first and second groups of the one or more wind turbines are determined dependent on the power production value of each of the wind turbines so that the one or more wind turbines of the first group has the lowest sum of power production values and the one or more wind turbines of the second group has the second lowest sum of power production values.

11. The method of claim 1, further comprising:

after a first time delay of a third group of one or more wind turbines, controlling the third group to operate in the power saving mode for a first power saving period of the third group; and wherein the first time delay of the second group is less than the first time delay of the third group.

12. A central controller for controlling power consumption of a power plant, which comprises a plurality of power generating units including a plurality of wind turbines, wherein the power plant is connected to an electrical power grid, wherein the central controller comprises:

an I/O interface configured to communicatively couple to the plurality of wind turbines;

and one or more processors configured to perform an operation, comprising, in response to determining that a power production value of the power plant is below a power threshold:

after a first time delay of a first group of one or more wind turbines, controlling the first group to operate in a power saving mode for a predefined first power saving period of the first group; and after a first time delay of a second group of one or more other wind turbines, controlling the second group to operate in the power saving mode for a predefined first power saving period of the second group;

wherein the first time delay of the first group is less than the first time delay of the second group; and wherein the power saving mode inhibits a power consuming activity for the wind turbines operating in the power saving mode.

13. The central controller of claim 12, comprising:

after the first power saving period of the first group has elapsed, controlling the first group to stop operating in the power saving mode; and after the first power saving period of the second group has elapsed, controlling the second group to stop operating in the power saving mode, such that the wind turbines are enabled to consume power.

14. The central controller of claim 13, wherein controlling the first group to stop operating in the power saving mode is limited to a second time delay of the first group, and wherein controlling the second group to stop operating in the power saving mode is limited to a second time delay of the second group.

15. A power plant, comprising:

a plurality of power generating units including at least one wind turbine; and a central controller communicatively coupled to the at least one wind turbine, wherein the central controller is configured to perform an operation, comprising, in response to determining that a power production value of the power plant is below a power threshold:

after a first time delay of a first group of one or more wind turbines, controlling the first group to operate in a power saving mode for a predefined first power saving period of the first group; and after a first time delay of a second group of one or more other wind turbines, controlling the second group to operate in the power saving mode for a predefined first power saving period of the second group;

wherein the first time delay of the first group is less than the first time delay of the second group; and wherein the power saving mode inhibits a power consuming activity for the wind turbines operating in the power saving mode.

16. The power plant of claim 15, comprising:

after the first power saving period of the first group has elapsed, controlling the first group to stop operating in the power saving mode; and after the first power saving period of the second group has elapsed, controlling the second group to stop operating in the power saving mode, such that the wind turbines are enabled to consume power.

17. The power plant of claim 16, wherein controlling the first group to stop operating in the power saving mode is limited to a second time delay of the first group, and wherein controlling the second group to stop operating in the power saving mode is limited to a second time delay of the second group.

18. A computer program product comprising non-transitory computer readable medium storing software code which, when executed by one or more processors, control a power plant by performing an operation, comprising:
  in response to determining that a power production value of the power plant is below a power threshold:
    after a first time delay of a first group of one or more wind turbines of the power plant, controlling the first group to operate in a power saving mode for a predefined first power saving period of the first group; and
    after a first time delay of a second group of one or more other wind turbines of the power plant, controlling the second group to operate in the power saving mode for a predefined first power saving period of the second group;
  wherein the first time delay of the first group is less than the first time delay of the second group; and
  wherein the power saving mode inhibits a power consuming activity for the wind turbines operating in the power saving mode.

19. The computer program product of claim 18, comprising:
  after the first power saving period of the first group has elapsed, controlling the first group to stop operating in the power saving mode; and
  after the first power saving period of the second group has elapsed, controlling the second group to stop operating in the power saving mode, such that the wind turbines are enabled to consume power.

* * * * *